(12) United States Patent
Nelson et al.

(10) Patent No.: US 9,613,079 B2
(45) Date of Patent: Apr. 4, 2017

(54) SYSTEM AND METHOD FOR PROVIDING A SYNCHRONIZED DATA REREPRESENTATION

(75) Inventors: Lester D. Nelson, Santa Clara, CA (US); Elizabeth F. Churchill, San Francisco, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 1956 days.

(21) Appl. No.: 12/049,250

(22) Filed: Mar. 14, 2008

(65) Prior Publication Data
US 2009/0234891 A1 Sep. 17, 2009

(51) Int. Cl.
*G06F 17/30* (2006.01)

(52) U.S. Cl.
CPC .. *G06F 17/30371* (2013.01); *G06F 17/30575* (2013.01); *G06F 17/3056* (2013.01)

(58) Field of Classification Search
CPC .............. G06F 17/30371; G06F 17/30575
See application file for complete search history.

(56) References Cited

U.S. PATENT DOCUMENTS

| | | | |
|---|---|---|---|
| 6,493,720 B1 * | 12/2002 | Chu et al. | |
| 7,143,100 B2 | 11/2006 | Carlson et al. | |
| 7,318,015 B2 | 1/2008 | Carlson et al. | |
| 8,015,494 B1 * | 9/2011 | Hull et al. | 715/746 |
| 2001/0030667 A1 | 10/2001 | Kelts | |
| 2002/0112237 A1 | 8/2002 | Kelts | |
| 2003/0071814 A1 * | 4/2003 | Jou et al. | 345/440 |
| 2005/0065423 A1 * | 3/2005 | Owen | 600/407 |
| 2005/0149871 A1 * | 7/2005 | Broman et al. | 715/724 |
| 2005/0198085 A1 * | 9/2005 | Blakey et al. | 707/204 |
| 2006/0095447 A1 * | 5/2006 | Dickinson et al. | 707/100 |
| 2006/0271563 A1 * | 11/2006 | Angelo et al. | 707/100 |
| 2007/0061752 A1 * | 3/2007 | Cory | 715/804 |
| 2007/0094350 A1 * | 4/2007 | Moore | 709/217 |
| 2007/0198437 A1 * | 8/2007 | Eisner et al. | 705/79 |
| 2007/0220415 A1 * | 9/2007 | Cheng et al. | 715/503 |
| 2008/0082539 A1 * | 4/2008 | Doane et al. | 707/9 |
| 2008/0148149 A1 * | 6/2008 | Singh et al. | 715/700 |
| 2008/0163078 A1 * | 7/2008 | Van Der Sanden et al. | 715/762 |
| 2008/0215675 A1 * | 9/2008 | Kaminitz et al. | 709/203 |
| 2008/0222599 A1 * | 9/2008 | Nathan et al. | 717/107 |
| 2008/0313648 A1 * | 12/2008 | Wang et al. | 719/315 |
| 2009/0112990 A1 * | 4/2009 | Campbell et al. | 709/205 |
| 2009/0157728 A1 * | 6/2009 | Fletcher et al. | 707/102 |
| 2009/0210388 A1 * | 8/2009 | Elson et al. | 707/3 |

OTHER PUBLICATIONS

"Damia—A Data Mashup Fabric for Internet Applications," by Altinel et al. In: VLDB '07 (Sep. 23-28, 2007). Available at: ACM.*

* cited by examiner

*Primary Examiner* — Alexey Shmatov
(74) *Attorney, Agent, or Firm* — Patrick J. S. Inouye; Krista A. Wittman

(57) ABSTRACT

A system and method for providing a synchronized data rerepresentation is provided. Data maintained by an originating application is accessed and the data is presented thorough an originating user interface. The data is marshaled into a form useable by a surrogate application with rerepresentation of the data through a surrogate user interface. Selections of the data are reflected across the originating user interface and the surrogate user interface. Actions on the data are synchronized between the originating application and the surrogate application.

24 Claims, 8 Drawing Sheets

SYSTEM AND METHOD FOR PROVIDING A SYNCHRONIZED DATA REREPRESENTATION

FIELD

The invention relates in general to data rerepresentation and, specifically, to a system and method for providing synchronized data rerepresentation.

BACKGROUND

Productivity software continues to evolve to provide new applications that exchange, process, manage, display, and represent data. However, despite the constant release of new or improved products, consumers often simply desire a product that combines the merits of several existing applications to display or represent data in a way that is unsupported by any of the applications alone. Many Software manufacturers attempt to accommodate customers by periodically offering newer versions or features of their applications, yet no single application can capture the breadth of possible combinations of divergent applications into a single offering.

Data rerepresentation is a special presentation of data maintained by an existing application, which is not ordinarily capable of providing the desired special presentation. Lacking suitably customized applications, customers sometimes attempt to re-program existing applications to accommodate their rerepresentaional needs, but often with only marginal success. Existing solutions generally lack sufficient structural stability. Innumerous functional interdependencies, legacy support considerations, source tree limits, and countless other design and implementational factors place constraints on the amount of change that an application will safely tolerate without risk to runtime stability. Any change may perturb the entire system, which further increases the difficulty of re-programming an existing application to flexibly rerepresent data based on individualized need.

Application programming interfaces (APIs) offer only a partial alternative to re-programming data rerepresentation in an application. APIs facilitate data sharing between applications, which can be customized as a rerepresentation. However, APIs are passive constructs particular to each called application and require specific callback facilities from the receiving application to enable synchronization of the data with the sending application. Moreover, without synchronization, a user is unable to switch back and forth between the data representations of the applications, which can result in inconsistent data interpretation.

Conventional model-view-controller selections attempt to separate data from the user interface of an application to facilitate multiple views of the data. A controller processes user actions through the user interface and updates a model, which maintains the data based on the user actions. All views that depend on the model are also updated. In addition, the controller provides changes directly to the view, which obtains data from the model. To change the view, though, the controller must expressly reprogram the underlying application, which can undermine operational stability and will also necessitate further modification of the application for each change in the view.

SUMMARY

Many users find themselves limited to organizational displays of data provided by an original application. Often, the user is unable to generate "customized" displays of the data from the application alone. Application surrogacy provides the users with a rerepresentation of the data through a surrogate application. The original application is accessed, which displays the data in an original representation. Next, the surrogate application and associated data is accessed. The data from the original application is placed over the data of the surrogate application to create the rerepresentation. State and selection consistency of the data is respectively maintained between the original application and associated data representation and the surrogate application and associated data rerepresentation. Logical consistency can also be maintained.

An embodiment provides a system and method for maintaining data consistency. An original representation of data is obtained. The data is provided as a representation. State and selection consistency of the data is maintained between the original representation and the rerepresentation.

A further embodiment provides a system and method for providing a synchronized data rerepresentation. Data maintained by an originating application is accessed and the data is presented thorough an originating user interface. The data is marshalled into a form useable by a surrogate application with rerepresentation of the data through a surrogate user interface. Selections of the data are reflected across the originating user interface and the surrogate user interface. Actions on the data are synchronized between the originating application and the surrogate application.

Still other embodiments will become readily apparent to those skilled in the art from the following detailed description, wherein are described embodiments by way of illustrating the best mode contemplated. As will be realized, other and different embodiments are possible and their several details are capable of modifications in various obvious respects, all without departing from the spirit and the scope. Accordingly, the drawings and detailed description are to be regarded as illustrative in nature and not as restrictive.

DETAILED DESCRIPTION

New applications and new versions of existing applications are continually being introduced. Notwithstanding, users often desire "customized" applications that combine various data representational aspects of individual applications not satisfactorily addressed by the applications existing on the market. With rare exception, a user may be able to re-program an application to adjust the features; however, many applications are unable to satisfactorily accommodate change.

Rerepresentation System

Application surrogacy allows a user to rerepresent data from two or more separate applications while maintaining selection and consistency of the data between the different representations. The approach leaves the underlying applications unmodified and therefore stable.

Figure 1:
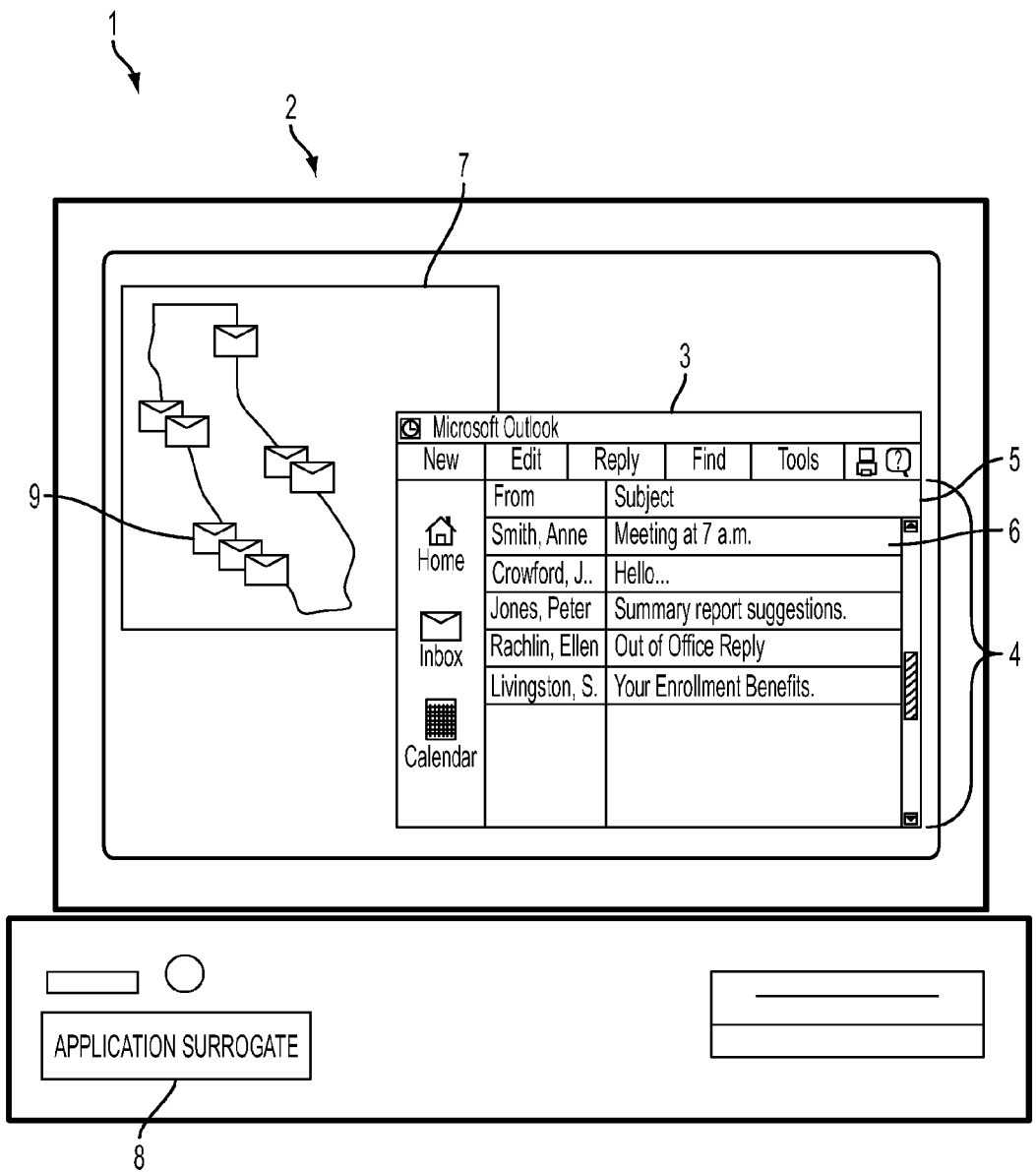
FIG. 1 is a functional block diagram showing, by way of example, a computer displaying multiple representations of data.

In general, every application represents data visually, internally, and logically in a manner consistent with the application's overall purpose and as dictated by the operational environment. FIG. 1 is a functional block diagram 1 showing, by way of example, a computer 2 displaying multiple representations of data. A user can execute available applications through the user interface of the operating system. For instance, a personal information manager, such as Outlook, licensed by Microsoft Corporation, Redmond, Wash., and a Web browser application, such as Internet Explorer, also licensed by Microsoft Corporation, supra, are two forms of productivity software frequently found in a workplace. Personal information managers provide access to email, calendaring, tasks, contact information, and similar personal communications or organizational tasks. Web browsers facilitate viewing of Web content frequently downloaded from a network, including a public data communications network, such as the Internet.

The look and feel of an application is frequently influenced strongly by the main purpose served. A personal information manager 3, includes tabular listings 4 of individual data items 6 organized under columns or fields 5, in an original representation. Conversely, Web browsers, centrally feature a graphical window within which Web content including textual, visual, and audio content are presented. In large, a user's viewing and use of the data is dictated by the data representational limitations of each application. A user of a personal information manager 3 is forced to interpret his email 6, for instance, in terms of the available columns or fields 5. As a result, a user could not ordinarily be able to organize his email 6 viewing by the locations of the sending correspondence.

A rerepresentation of the emails 6 can be generated using a surrogate application. First, the surrogate application, such as Yahoo! Maps, published as Web content by Yahoo! Inc., Sunnyvale, Calif., can be accessed by the computer 2 through a Web browser. Next, the emails 6 from the personal information manager 3 are placed over a map of California 7 to create a rerepresentation, which provides a spatial display of the emails 6, each represented by an icon 9 placed over a location within the state of California map 7. The placement of the emails on the map provides a visualization of where the senders of the email 6 are located.

Rerepresentations bring together two or more applications and their data. The applications and the data can be located external to the computer in a distributed system, such as described further below with reference to FIG. 2. Alternatively, the applications and the data can be located on the same physical computer 2, such as further described below with reference to FIG. 4. Specific rerepresentation arrangements will now be discussed.

The data 6 shared between the original representation and the rerepresentation can be maintained using an application surrogate 8. The application surrogate 8 applies an Emitter-Base-Collector model to the original representation and the rerepresentation to synchronize data for maintaining state, selection, and logical consistency. Application of the Emitter-Base-Collector model is described further with reference to FIG. 3.

Distributed Rerepresentation

The Web has increasingly become a repository of arcane and wide ranging information, much of which may be useful in driving new forms of rerepresentations. Most Web content is available online via remote sources. As well, historically standalone applications have been increasingly implemented online through standard Web interfaces. The distinctions between local and remote applications, as well as their data, has thus been blurred in favor of distributed arrangements.

Figure 2:
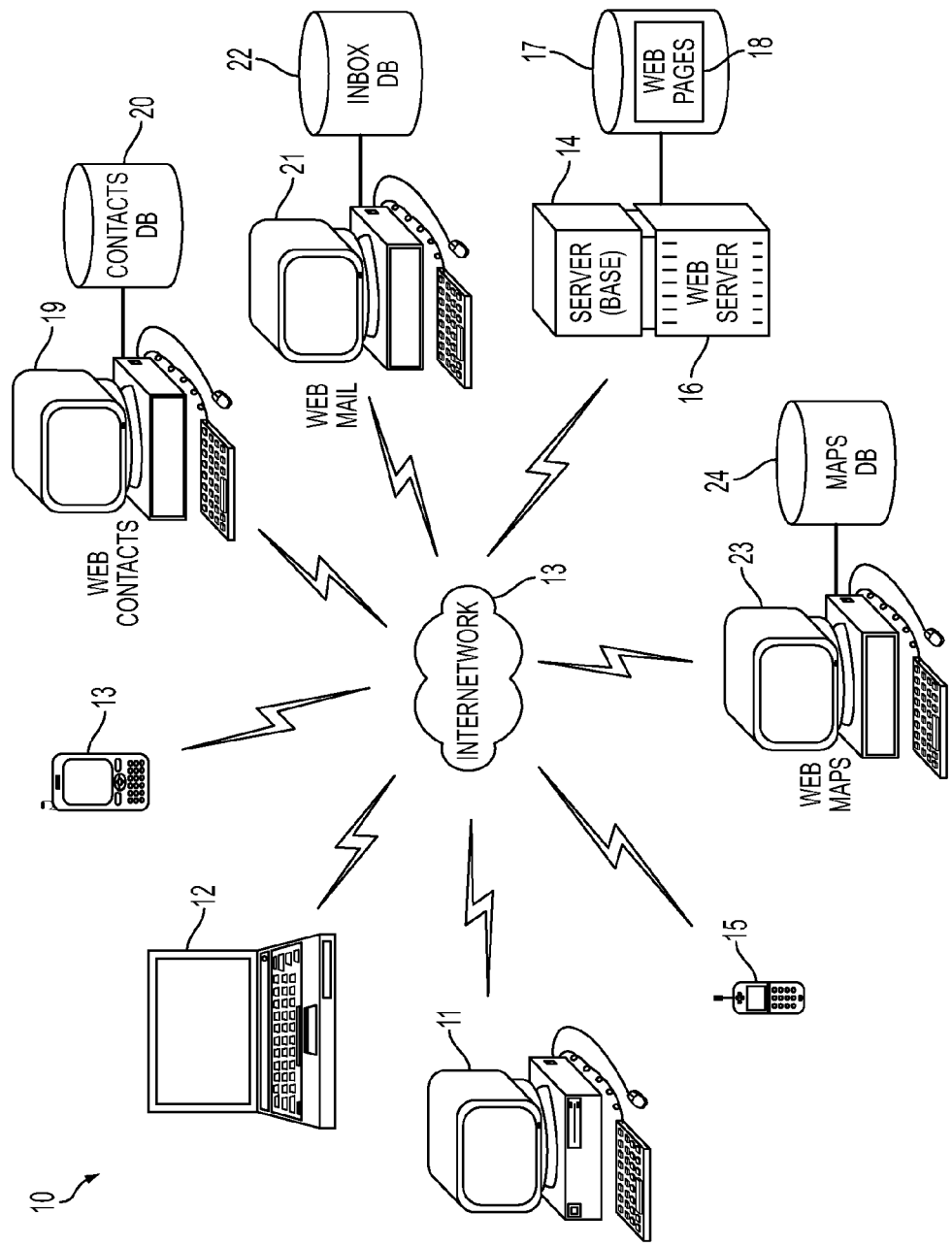
FIG. 2 is a functional block diagram showing, by way of example, a distributed system for rerepresenting data, in accordance with one embodiment.

Rerepresentation can occur in a distributed manner. FIG. 2 is a functional block diagram showing, by way of example, a distributed system 10 for rerepresenting data, in accordance with one embodiment. An end-user computer 11 is connected to a server 14 via an internetwork 16, such as the Internet. The server 14 can include, for instance, a Web server 16 that is coupled to a database 17, which stores Web pages 18 for perusal by end users. Other end-user devices, such as a desktop 11 computer, a notebook computer 12, a handheld device, such as a Personal Digital Assistant (PDA) 13, and a Web-enabled cellular telephone 15, could also be used for rerepresentation. At a minimum, each device should include accessibility to an internetwork and have an ability to execute an application. For clarity, rerepresentation will be discussed with reference to only the computer 11, but applies generally to all such end-user devices 12, 13, 15.

The computer 11 accesses distributed Web-based applications 19, 21, 23 for processing and displaying data. The data can include text, numbers, images, and sound bites. Other types of data are possible. Each application 19, 21, 23 includes data stored in a remote database 20, 22, 24. For example, a Web mail application 21 has an associated inbox database 22, which contains user email. A Web contacts application 19 has an associated contacts database 20. Similarly, a Web maps application 23 has an associated maps database 24. The computer 11 executes these applications and their data by accessing Web pages 18 centrally served through the Web server 16 to access and display the data stored in the databases 20, 22, 24.

Mashups are an increasingly popular approach to combining the data functionality, often online, of different Web-based applications. A mashup combines data from multiple sources to generate a single tool. The applications can communicate and share through published application programming interfaces ("API") and can generate rerepresentations of the shared data. For example, Web mail inboxes generally include ordered lists of email, which can be sorted by field, such as sender, subject, date, time, and size. A user is generally unable to display the emails by fields other than those provided. To rerepresent the email, the user can apply a mashup to combine data from other sources, such as the Web maps and Web contacts applications. Map data from the Web map application is combined with contact data from the Web contacts to place the email on a map location matching the sender's location. The mashup thus provides a rerepresentation of the emails in the Web mail application, which are each displayed by the location associated with the sender in the contacts database.

Figure 3:
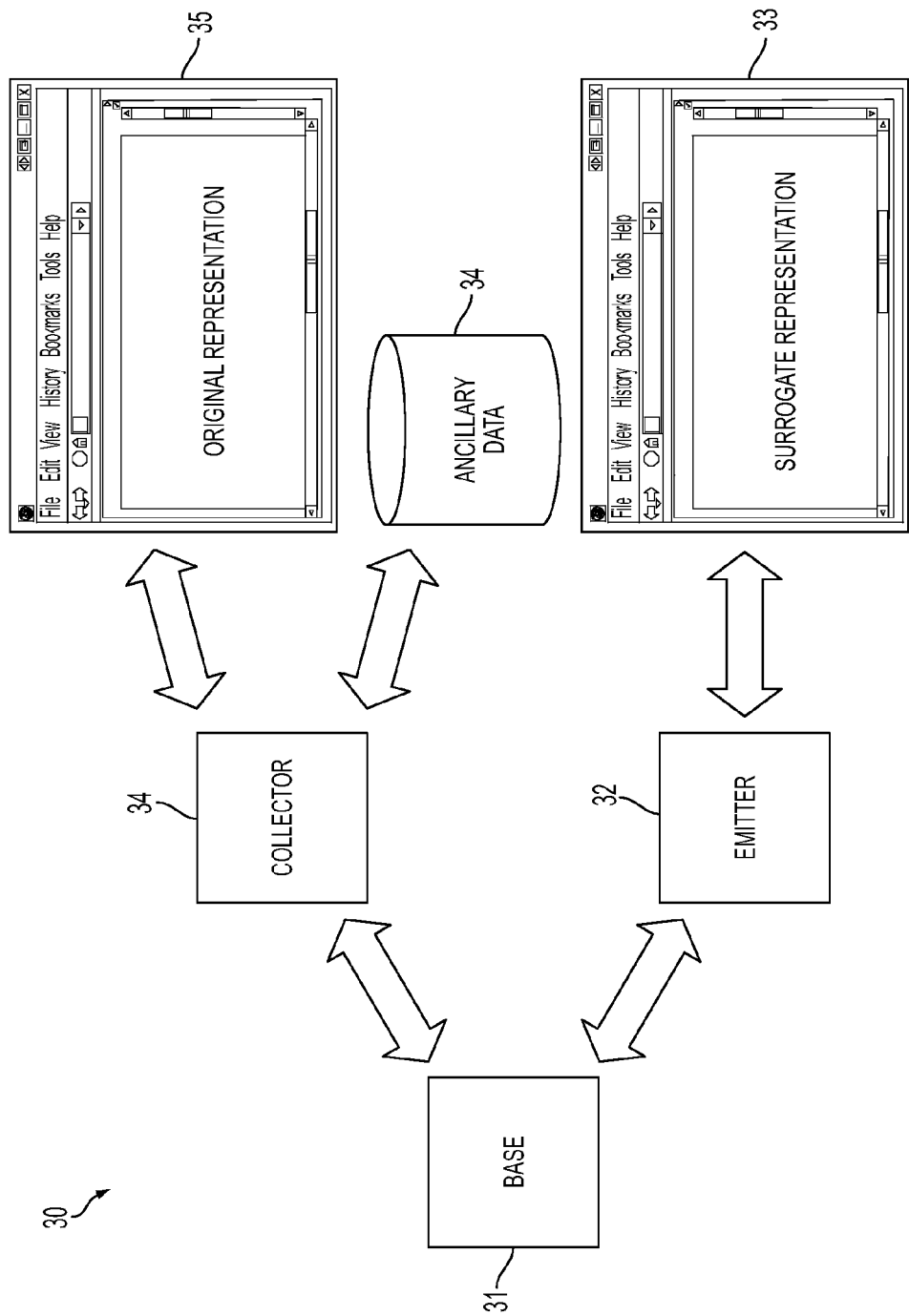
FIG. 3 is a functional block diagram showing logical components used in rerepresenting data, in accordance with one embodiment.

Synchronicity and interactivity are respectively provided between the original application and representation and the surrogate application and rerepresentation using an Emitter-Base-Collector model. FIG. 3 is a functional block diagram showing logical components 30 used in rerepresenting data, in accordance with one embodiment. Through the Emitter-Base-Collector model, state, selection, and logic consistency of the data can be respectively maintained between the original application and associated data representation and the surrogate application and associated data rerepresentation. Other processes for synchronizing data are possible.

A collector 34 is associated with an original application and tracks primary actions of a user applied to the user interface of the original application, which displays or provides data to the user in an original representation 35. The collector 34 provides the primary actions to a base 31. In turn, the base 31 marshalls the primary actions to an emitter 32 that is associated with a surrogate application, which applies the primary actions to the user interface of the surrogate application, which displays or provides the same data as a rerepresentation or a surrogate representation 33. As used herein, any reference to a "rerepresentation" or "surrogate representation" will be understood to include the other term, except as specifically indicated otherwise.

The collector 34 can also maintain ancillary data 36. Ancillary data 36 is data or metadata that can be used to supplement the data for rerepresentation. For instance, rerepresenting textual data as spatial data can require ancillary data 36 that includes locational information, such as spatial coordinates or an address. The ancillary data 36 can be extracted from the data itself or accessed from a separate application that works congruently with the original representation through the original application. The collector 34 also tracks updates to the ancillary data 36 and provides the updates to the base 31. The base 31 then provides the updates to the emitter 32 for applying to the surrogate representation 33. Other forms, types, and sources of ancillary data are possible.

The emitter 32 collects surrogate actions performed by the user upon a user interface of the surrogate application. The emitter 32 transmits the surrogate actions to the base 31, which marshalls the surrogate actions and further transmits the surrogate actions to the collector 34 for applying to the original application.

Standalone Rerepresentation

Figure 4:
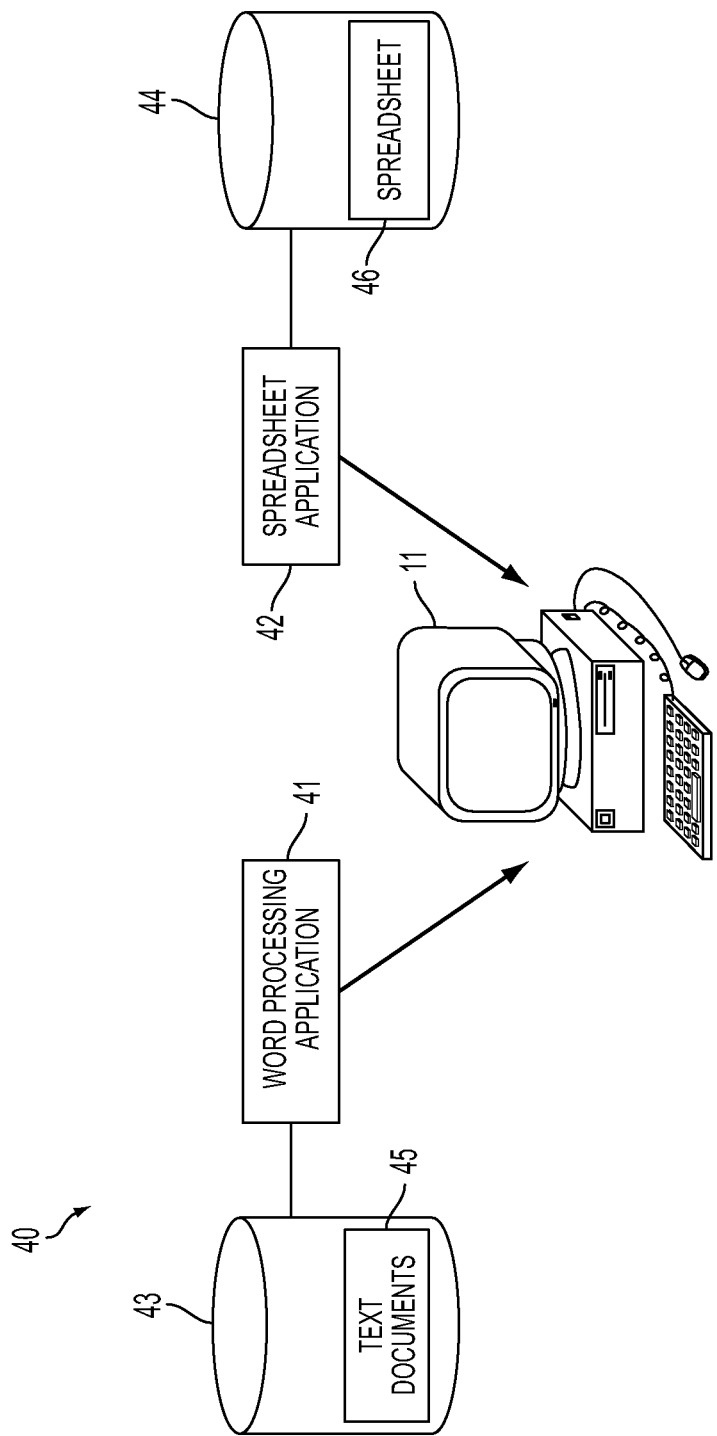
FIG. 4 is a functional block diagram showing, by way of example, a standalone system for rerepresenting data.

Standalone rerepresentation is a simplification of the more generalized distributed arrangement. In a standalone arrangement, the applications and data can be stored locally on the computer 11. FIG. 4 is a functional block diagram showing, by way of example, a local system 40 for rerepresenting data. The computer 11 accesses original applications 41, 42 maintained locally for processing and displaying data, such as a word processing application 41 and a spreadsheet application 42. Each application 41, 42 stores data specific to the format used by the program, specifically text documents 45 and spreadsheets 46, respectively. The data can be stored locally as files 43, 44 maintained on the computer 11.

Each application, whether local or distributed, publishes an API through which other applications can directly interact. The range of operations available to a calling application via an API vary depending upon the called application. For purposes of rerepresentation, the called application is referred to as the original application and the calling application is referred to as the surrogate application. The original application's API must provide access to the data to be rerepresented, as well as the ability to remotely influence application behavior. Data access and remote behavior control enable the Emitter-Base-Collector model to respectively provide state and selection consistency. In a further embodiment, logical consistency, which reflects the completeness and consistency of data across the application is also provided, where available through the original application's API.

Here, the spreadsheet application 42 embeds formulas and data cell interdependencies directly into each spreadsheet 46. The word processing application 41 could become a surrogate application through the Emitter-Base-Collector model to rerepresent the spreadsheet data as a text document 45. The collector would obtain the spreadsheet data for the base. The base would then marshall the spreadsheet data by, for instance, interpreting each formula and understanding the data interdependencies. The emitter would fully provide the marshalled data to the word processing application 41 for rerepresentation to the user.

Data Collection and Transmission

Figure 5:
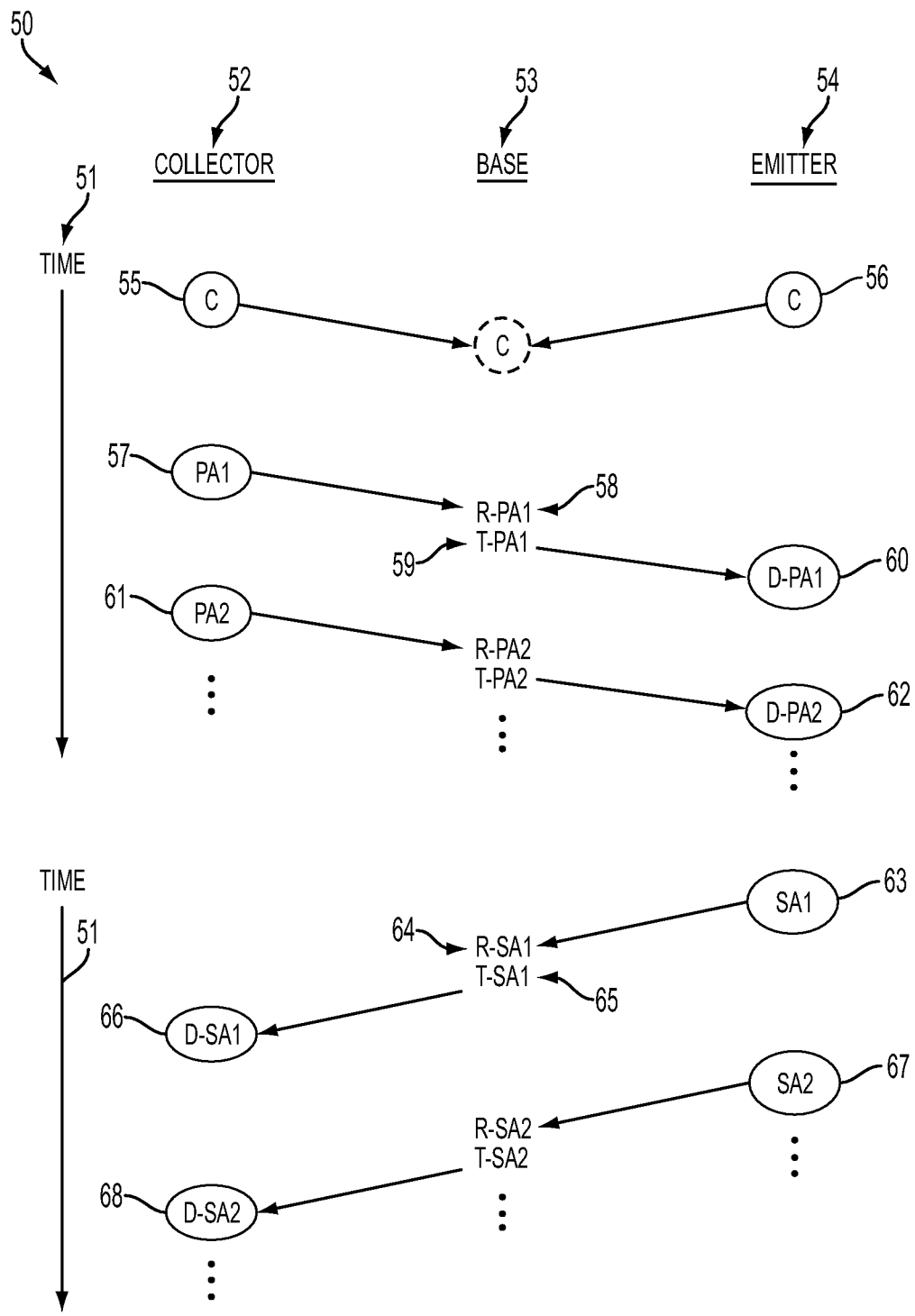
FIG. 5 is a timing diagram showing data collection and transmission by a collector and an emitter.

Data flow is moderated by the Emitter-Base-Collector model. FIG. 5 is a timing diagram showing data collection and transmission by a collector 52 and an emitter 54. The axis 51 represents time. The collector 52 and emitter 54 both form connections 55, 56 to a base 53, which acts as a go-between. The Emitter-Base-Collector model is applied to both the original representation of data and the rerepresentation of the same data. An agent within the collector 52 watches the original application and records primary actions performed by the user through the user interface. Similarly, an agent within the emitter 54 watches the surrogate application and records surrogate actions performed by the user through the user interface. The primary and surrogate actions can include selection of data or changes to the data, including adding, deleting, transferring, and altering the data. Other types of primary and surrogate actions are possible.

The collector 52 collects and sends the primary actions ("PA1") 57 to the base 53. The base 53 receives the primary actions ("R-PA1") 58 for marshalling and transmitting the marshaled primary actions ("T-PA1") 59 to the emitter 54. Once received, the emitter 54 applies the marshalled primary actions ("D-PA1") 60 to the rerepresentation of the data. The synchronization process is repeated for additional primary actions 61-62.

In similar manner, the emitter 54 collects and sends the surrogate actions ("SA1") 63 to the base 53. The base 53 receives the surrogate actions ("R-SA1") 64 for marshalling and transmitting the marshaled surrogate actions ("T-SA1") 65 to the collector 52. Once received, the collector 52 applies the marshalled surrogate actions ("D-SA1") 66 to the original representation of the data. The data synchronization is repeated for additional surrogate actions 67-68.

The synchronization process of primary and surrogate actions, using the Emitter-Base-Collector model, provides state, selection, and logical consistency. State consistency ensures that changes due to events are replicated in all representations. Selection consistency ensures that a selection made by a user is reflected in all of the representations. Logical consistency includes applying logic to ensure meaningful consistency and completeness of the data. Other consistencies are possible.

To ensure that the consistencies are maintained, the actions can be collected and transmitted in real time, per a schedule, or upon demand. Other times for applying the Emitter-Base-Collector model are possible. In real time, the actions are collected and transmitted as they occur to provide a user with the most up-to-date representations. A user can also schedule collection times for the actions performed on the original interface and the surrogate interface.

The action collections can be scheduled simultaneously at both interfaces or in sequence. The sequence can include a collection by the collector and next, collection by the emitter, or vice versa. However, other patterns for sequenced collection are possible. The timing between each collection can also be customized by the user, who can decide how often the surrogate actions will be applied to the original interface and how often the primary actions will be applied to the surrogate interface. For instance, if a user favors the surrogate representation, more actions will likely be performed on the surrogate interface than the original interface. The user can thus schedule the emitter to collect and transfer actions more frequently than the collector. Further, the collector and emitter can submit a query to the base for actions. If available, the base then transmits any actions to the requesting module for application. Other processes and timing for data synchronization are possible.

Operation Flow

Figure 6:
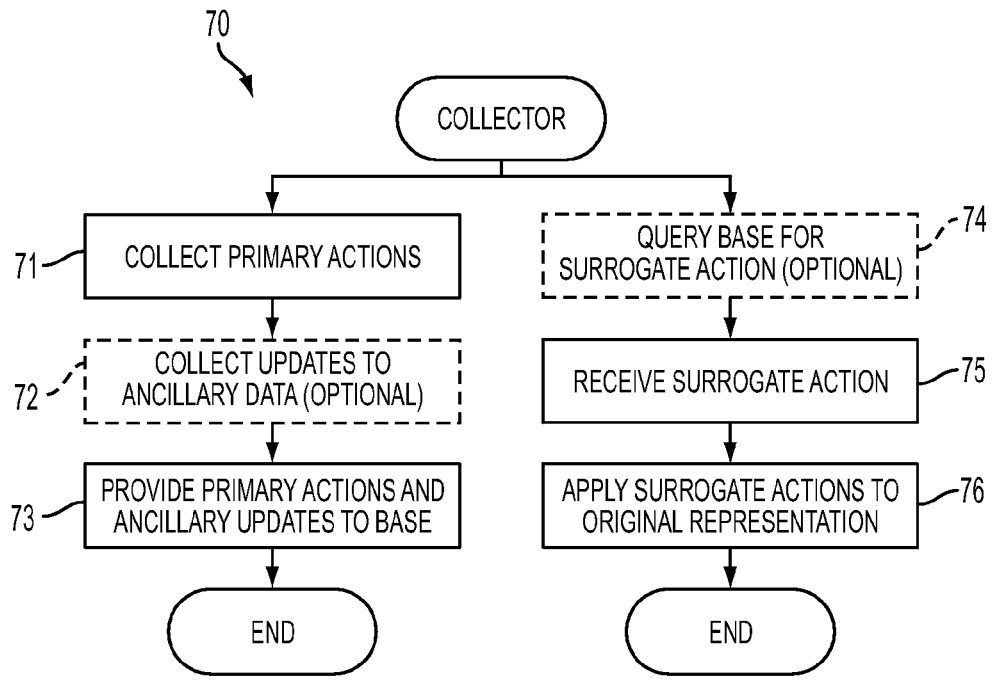
FIG. 6 is a process flow diagram showing a synchronization process for a collector.

The collector and the emitter perform similar sets of operations; however, the collector maintains the original representation and the emitter maintains the surrogate representation. FIG. 6 is a process flow diagram showing a synchronization process 70 for a collector. Data is displayed through an original user interface by an original application. The collector collects primary actions performed upon the original user interface (block 71). If the original application is communicating with a supplemental application, data provided by the supplemental application can be used as ancillary data. Updates to the ancillary data, when available, are also collected by the collector (block 72). The primary actions and the ancillary updates, if applicable, are provided to the collector by an agent that tracks the actions performed on the data in the original interface. The primary actions and the ancillary data are then transmitted to the base for marshalling and further transmission (block 73). Meanwhile, the collector receives surrogate actions collected by the emitter (block 75). The surrogate actions are received automatically or through requests from the collector (block 74). Once received, the surrogate actions are applied to the original representation (block 76). Other processes for the collector, including other methods for receiving the actions, are possible.

Figure 7:
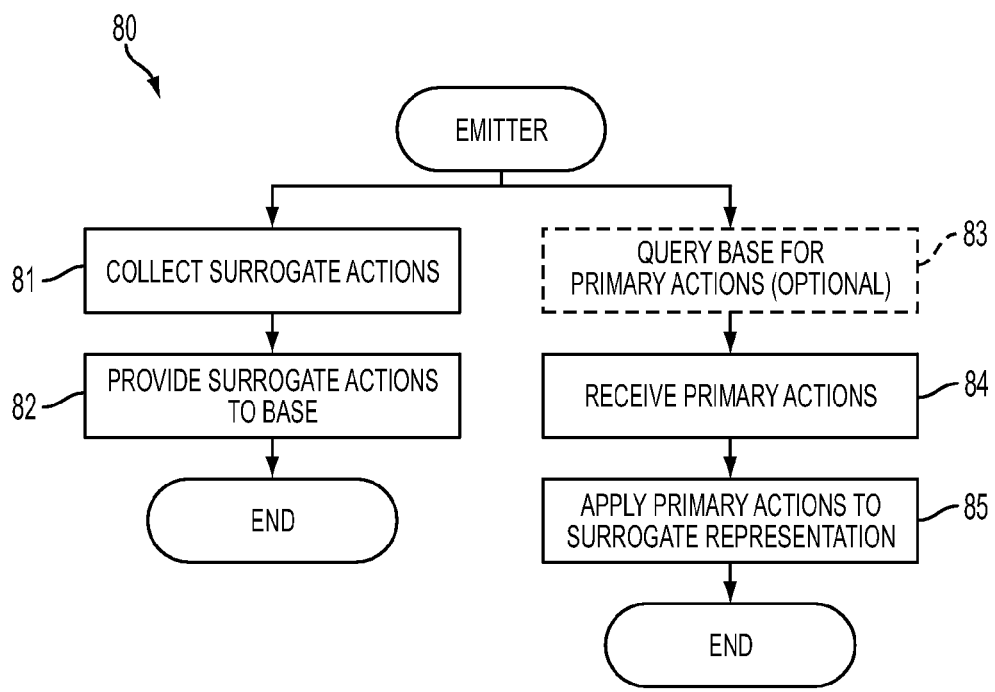
FIG. 7 is a process flow diagram showing a synchronization process for an emitter.

The emitter performs similar functions. FIG. 7 is a process flow diagram showing a synchronization process 80 for an emitter. The emitter collects surrogate actions performed upon a surrogate interface (block 81), which can result in changes to the data, as originally represented. The surrogate actions are then provided to a base for marshalling and transmitting to a collector (block 82). Meanwhile, the emitter also receives primary actions from the collector (block 84). The emitter can submit a query for the primary actions to the base (block 83); otherwise, the primary actions are received automatically. The emitter applies the primary actions received to the surrogate representation to maintain state, selection, and logical consistencies between the original and the surrogate representations (block 85). Other processes for synchronizing the data and receiving actions are possible.

Data Rerepresentation

Data representation is available in many different forms, including modification or projection formats, and graphical or textual formats. In the modification format, data is rerepresented by changing the form of representation, such as from graphical to textual or textual to graphical representations. An example of a modification rerepresentation is discussed below with reference to FIG. 8. In the projection format, data displayed in a rerepresentation can include more or less data than an original representation. State, selection, and logical consistencies are maintained for the data shared between the two representations. An example of a projection rerepresentation is further discussed below with reference to FIG. 9. Other types of modification rerepresentations are possible.

Graphical rerepresentation presents data using a graphical display, such as a map, bar graph, chart, spatial representations, or a timeline. An example of a graphical rerepresentation is discussed below with reference to FIG. 8. Other types of graphical displays are possible. Textual rerepresentation involves representing data as text, which can include textual lists and text documents. An example of a textual rerepresentation is discussed below with reference to FIG. 9. Other types of textual displays are possible.

Graphical Rerepresentation

Email is a widely-used form of communication that allows users to share information with others online. Email can also be used as a tool for communicating within an organization or across different organizations. Although email is offered by numerous ISPs and can be accessed through different applications, such as through an email client or a Web browser, the general set-up of an email inbox remains fairly standard. In general, each individual email is identified in an ordered list. The order can be determined using characteristics of the email, including subject, sender, time, date, and size, which are displayed as columns or fields. The spatial presentation and representation of the emails are limited to the provided fields, which may not always provide an option for ordering or organizing data that is useful to a user. For example, imagine a manager of a world wide company who oversees sales groups in the United States, Germany, and Japan. The members of the sales groups are required to report to the manager at least once a week via email. In addition, the manager receives emails from customers across the world. To effectively respond to the large numbers of email received, the manager desires to graphically represent the email across a map of the globe, which will aid him in interpreting the regional issues of concern to each sales group. The graphical representation allows the manager to attend to those emails that are sent from a particular location, such as Berlin, Germany, which is ten hours ahead of Seattle, Wash., before those of other areas where the work day has not yet begun. Other groupings of data using a graphical rerepresentation are possible.

Figure 8:
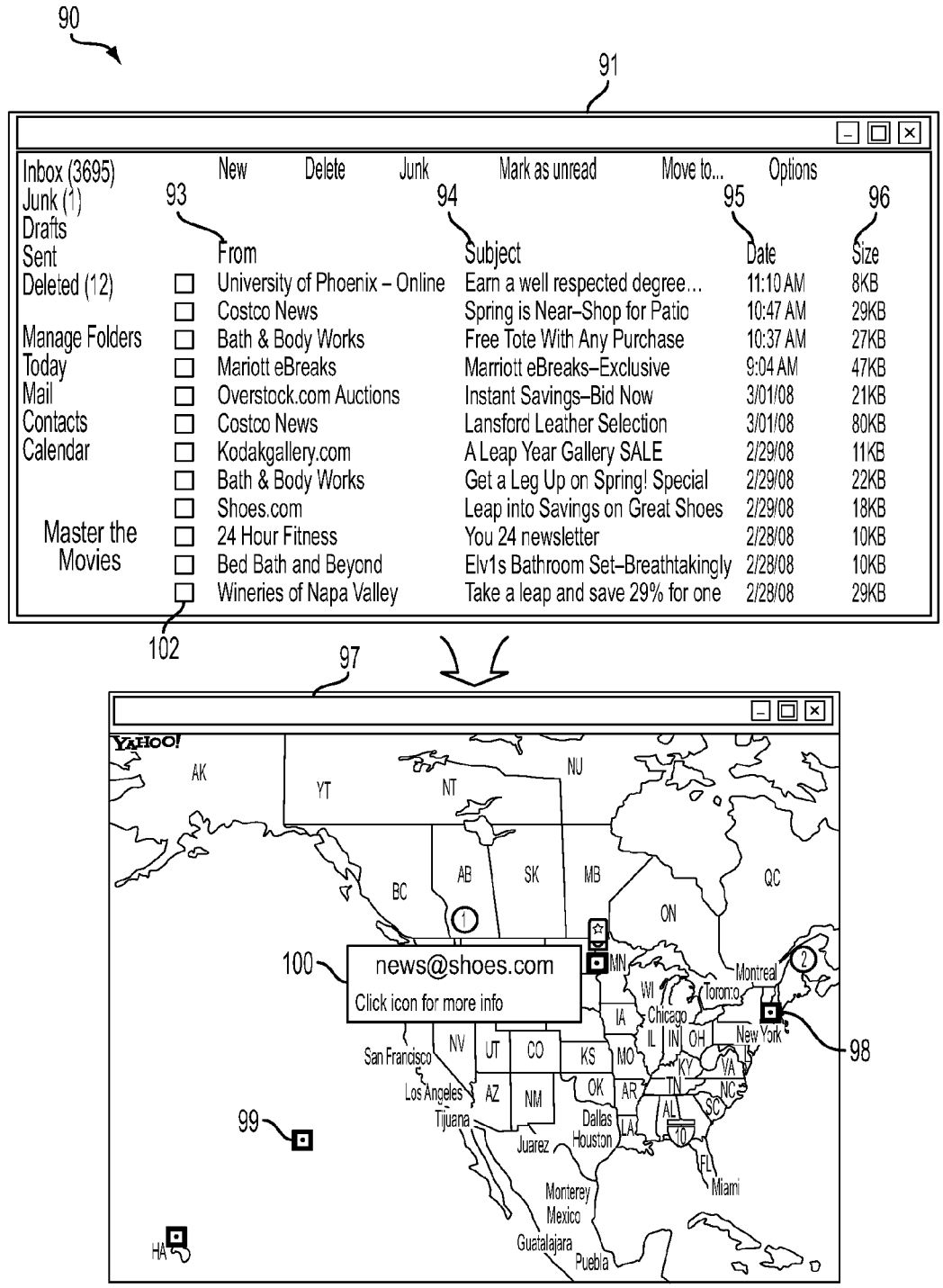
FIG. 8 is a block diagram showing, by way of example, a distributed graphical rerepresentation of data.

FIG. 8 is a block diagram showing, by way of example, a graphical rerepresentation of data 90. An email inbox is commonly displayed as an ordered list of emails 92 through an original user interface 91. The ordered list presents an original representation of the email. Each email is described by information fields, including sender 93, subject 94, date 95, time 95, and size 96. A user can order the emails 92 in increasing or decreasing order by selecting one of the fields 93-96. The emails can also be sorted into folders created by the user. The sorting can be based on the content of each email, such as email context, date, sender, and organization. Although the sorting and ordering of the inbox is helpful to organize large amounts of data, the user is unable to rerepresent the data outside of the fields provided.

The user can access additional applications, such as a graphical display to rerepresent the data. The data from the original representation can be placed over a display of the additional application. The graphical display can include a map, bar graph, pie chart, and spatial distributions, as well as other types of graphical representations. Returning to the above example, the international manager's emails are accessed through a personal information management program. To create a graphical rerepresentation based on location, the emails are layered over a map through a surrogate user interface. Together, the map and the data form a surrogate representation 97. The surrogate representation 97 allows the manager to visually determine a spatial distribution of the emails 92 received. The graphical rerepresentation 97 displays the emails by location, which can include, a home, work, or event location, as well as a location of the sender at the time that the email was sent.

Ancillary data can also be accessed by a collector to provide or supplement the location information of each email. The ancillary data can be obtained from a supplemental application that communicates with the original user interface, from the data itself, or from information associated with the data. For instance, contact manager applications enable users to maintain a contact list, including information, such as name, location, position, telephone number, and contacts. The location information can include a work address, home address, or satellite office address. The location information for people that send emails received in an email inbox can be obtained from the contact list as ancillary data. If the ancillary location information is not available, the ancillary data can be obtained from the emails using the content of each email or information associated with each email, such as the email address.

The location associated with each email can be used to place the emails on the map of the surrogate representation 97. The emails can be displayed, for instance, using an icon 98 located over the address, city, state, or country associated with the location. The icon 98 can represent an individual email or multiple emails over each location. If the location of an email is undetermined, the email can be represented on the map by placing an undetermined icon 99 in a default city, state, or country having no other emails. The emails with undetermined locations can also be placed in an ocean or in a text box associated with the map. The undetermined icon 99 can be the same or different as the icons that represent emails by location. Other icons and placements of the emails are possible.

To assist the user in viewing map locations that contain many emails, the user can zoom in and out of selected locations using a cursor, remote control, buttons, or a toggle. Alternative arrangements of the emails can be applied at different zoom levels of the map. For example, on a world map, emails can be located by country. As the user zooms further into one country, the emails can then be displayed by city and, when zoomed in further, the emails can be displayed by address. Additionally, distortions can be applied to the map to enlarge locations that contain more emails. Other map representations and characteristics are possible.

Details about each email can be displayed by a popup box 100 when a user hovers over each icon with a cursor. The popup box can include information, such as a number of emails represented, brief summaries of the content, attachments, a photograph of the sender, a different map, fields 93-96 from the original interface, further icons representing an urgent message, an important sender, and related emails. Other detailed information and displays of the information are possible.

The appearance of the icon can be adapted to reflect email characteristics through icon actions. The icon actions can include the display, shape, form, size, and movement associated with each icon. For instance, a location containing new email can include a mailbox with a raised flag to indicate to the user that there is new mail. Additionally, if an email is urgent, the associated icon can flash, spin, or be colored red to catch the user's attention. The user can create the icons and icon actions used to display the email characteristics or the icons and the associated actions can be predetermined. Other types of icons and icon actions are possible.

When the original email inbox representation is displayed, the user can perform actions on the original interface to effect changes to the emails, including creating, deleting, selecting, editing, sending, or saving an email message. An agent tracks and records the actions to the original interface, which is collected by a collector. Returning to our example above, the international manager is reviewing all emails associated with New York, N.Y. After reviewing the first email, the manager decides to respond by sending an email. The first email is then moved to a folder titled "New York Office." The second email is deleted, and the third email is opened, read, and kept in the email inbox. The agent records the actions taken by the manager, which are collected by the collector and transmitted to a base. The base then transfers the actions to an emitter. The emitter applies the actions to the surrogate map representation. On the surrogate map representation, the content of the response message is created and stored in a sent folder, the first email is transferred from the email inbox to the folder titled "New York Office," the second email is deleted, and the third email remains in the email inbox. If the third email is associated with an icon that represents a status of the email, including an opened or unopened status, the icon will be changed to represent the opening of the email.

The collector can also collect the updates to the ancillary data, which are transferred to the base and then to the emitter. The emitter applies the updates to the surrogate representation. Similarly, actions performed on the surrogate interface are tracked, collected, and transmitted for display through the original representation.

In one embodiment, the email can be spatially arranged on the surrogate representation by categories, such as organization, business activities, and email content. Other spatial representations and categories of representations are possible.

Textual Rerepresentation

Figure 9:
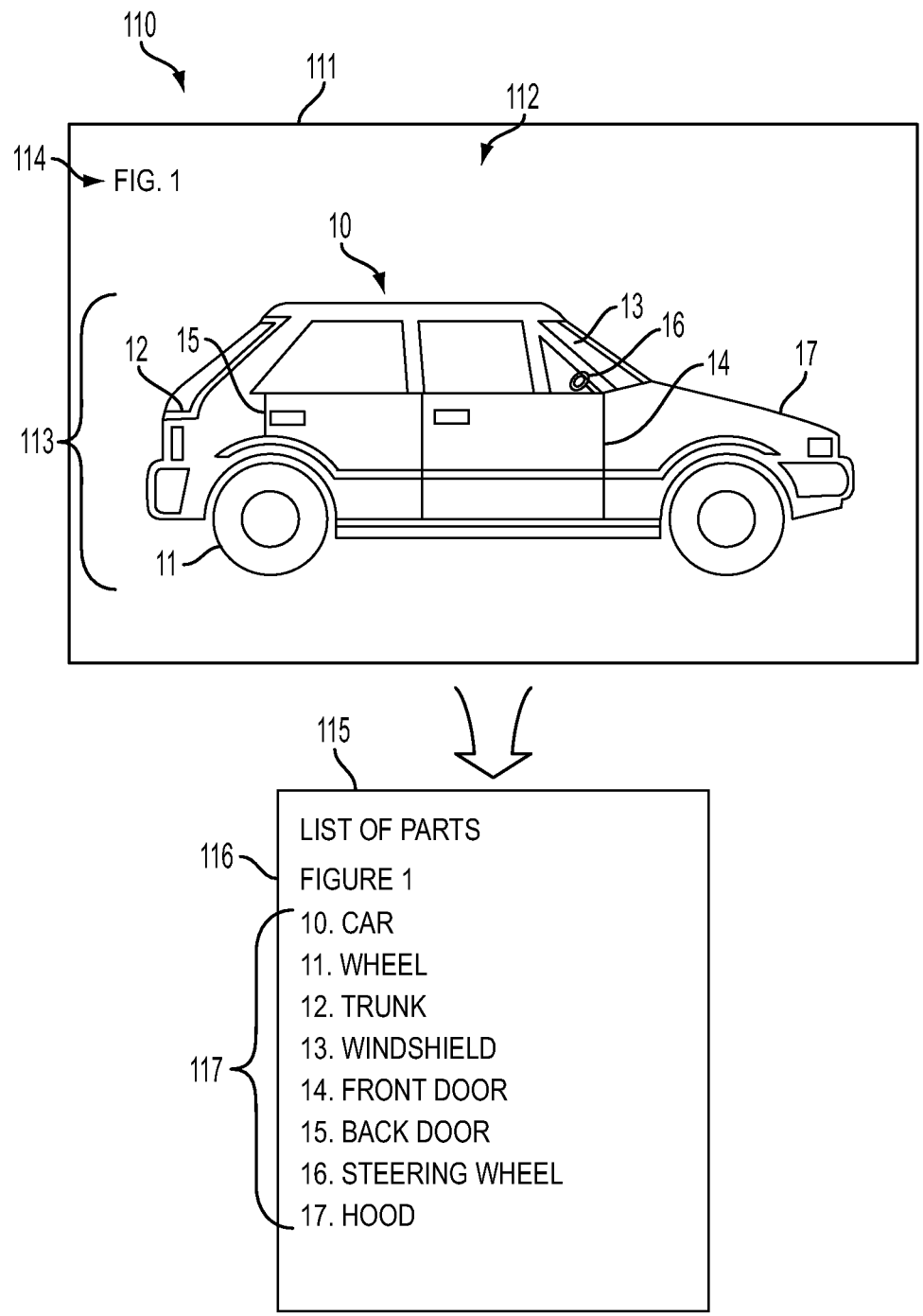
FIG. 9 is a block diagram showing, by way of example, a local textual rerepresentation of data.

Textual rerepresentations allow a user to rerepresent data using text, such as text documents, text lists, and other forms of textual display. More specifically, a user can rerepresent data as a list of parts, redacted text, and reorganized text, as well via other displays of the data. FIG. 9 is a block diagram showing, by way of example, a local textual rerepresentation of data. An original representation 111 is displayed through an original user interface. In a further example, a user is preparing a patent application. Patent drawings accompany the textual patent application and include reference numbers of parts or processes, which are further described in the application. The patent drawings are prepared using drafting software, which provides the original representation of data 111, including a drawing title 114 and a subject of the drawings, such as a car 112. The parts of the car are labeled with reference numbers 113 to specifically identify each particular part in the drawings. The reference numbers are also used in the patent application, which describes the car 112 and the car parts 113 in detail.

Users often experience difficulty in keeping track of the reference numbers used, as well as to what part each number refers. The reference numbers can be rerepresented as a list of parts, which is a surrogate representation of the data. Using the Emitter-Base-Collector model, the original representation and the surrogate representation are processed to maintain state, selection, and logical consistency. An agent watches the original representation 111 and records primary actions performed on the original interface, which can result in a change of the reference numbers 113. The primary actions are collected by a collector for transmission to a base, which marshalls the data and further transmits the primary actions to an emitter. The emitter applies the primary actions to the surrogate representation 115, which displays the list of parts.

Conversely, surrogate actions performed on the surrogate interface are tracked by an agent and transmitted to a base via the emitter. The base further transmits the surrogate actions to the collector, which are then applied to the original representation to maintain consistency between the two different representations.

The synchronization provided by the Emitter-Base-Collector model can be applied during the drafting of the drawings or after the drawings have been completed. When the model is applied during the drafting, reference numbers will be added to the list after the user enters a new reference number in the drafting software. Other actions, such as the replacement, deletion, and change of order of the numbers will also occur in parallel to the drafting. Other timing or applications of the Emitter-Base-Collector model are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for maintaining data consistency, comprising:
    an original representation of data from a first application;
    a rerepresentation of the original data representation presented as an overlay of the data from the first application, using ancillary data, over a second application without modifying the first and second application;
    a collector to obtain the ancillary data from a supplemental application that communicates with the first application and to supplement the data from the first application with ancillary data for the rerepresentation and to track actions applied to a user interface of the first application by a user, wherein the ancillary data comprises information related to the data from the first application for placement of that data with respect to the data from the second application within the rerepresentation;
    an emitter to apply the tracked actions to a user interface of the second application and to collect surrogate actions performed by the user upon the user interface of the second application;
    a base to maintain state and selection consistency of the data between the original representation and the rerepresentation by receiving the tracked actions from the collector and the surrogate actions from the emitter, and marshalling the tracked actions to the emitter and the surrogate actions to the collector, wherein the collector applies the surrogate actions to the user interface of the first application; and
    a processor to execute the collector, emitter, and base.

2. A system according to claim 1, further comprising:
    a logical consistency module to maintain logical consistency of the data between the original representation and the rerepresentation.

3. A system according to claim 1, wherein the state consistency maintains changes between the representation and the rerepresentation by replicating the changes in the representation and the rerepresentation.

4. A system according to claim 1, wherein the selection consistency maintains selections by a user between the representation and the rerepresentation by reflecting the selections in the representation and the rerepresentation.

5. A system according to claim 1, further comprising:
    a transmission module to transmit the actions to at least one of the representation and the rerepresentation in at least one of real time, per a schedule, or upon demand.

6. A system according to claim 1, wherein at least a portion of the original representation of the data is changed from at least one of a graphical representation to a textual representation via a list and a textual representation to a graphical representation as the rerepresentation using the ancillary data comprising location coordinates.

7. A system according to claim 1, wherein the collector collects the tracked actions performed within the representation based on a timing customized by the user, the emitter collects the surrogate actions performed within the rerepresentation based on a further timing customized by the user, and the base more frequently marshals one of the tracked actions to the emitter and the surrogate actions to the collector based on the timing or the further timing customized by the user.

8. A method according to claim 1, further comprising:
    collecting the actions performed within the representation and the rerepresentation based on a timing customized by the user; and
    more frequently marshalling the actions within the one of the representation and the rerepresentation to the other of the representation and the rerepresentation based on the timing customized by the user.

9. A method for maintaining data consistency, comprising the steps of:
    obtaining an original representation of data for a first application;
    obtaining ancillary data from a supplemental application that communicates with the first application, wherein the ancillary data comprises information related to the data from the first application for placement of that data with respect to data from a second application within a rerepresentation;
    supplementing the data of the first application with the ancillary data;
    generating the rerepresentation of the data by overlaying the data from the first application over the second application using the ancillary data from the supplemental application without modifying the first and second applications; and
    maintaining state and selection consistency of the supplemented data between the original representation and the rerepresentation, comprising:
        monitoring via an emitter actions performed within the rerepresentation and applying the actions within the representation via a collector;
        monitoring by the collector actions performed within the representation and updates to the ancillary data, and applying the actions and updates within the rerepresentation via the emitter; and
        marshalling via a base the actions within the representation from the collector to the emitter and the actions within the rerepresentation from the emitter to the collector.

10. A method according to claim 9, further comprising:
    maintaining logical consistency of the data between the original representation and the rerepresentation.

11. A method according to claim 9, wherein the state consistency maintains changes between the representation and the rerepresentation by replicating the changes in the representation and the rerepresentation.

12. A method according to claim 9, wherein the selection consistency maintains selections by a user between the representation and the rerepresentation by reflecting the selections in the representation and the rerepresentation.

13. A method according to claim 9, further comprising:
transmitting the actions to at least one of the representation and the rerepresentation in at least one of real time, per a schedule, or upon demand.

14. A method according to claim 9, further comprising:
changing at least a portion of the original representation of the data from at least one of a graphical representation to a textual representation via a list and a textual representation to a graphical representation as the rerepresentation using the ancillary data comprising location coordinates.

15. A system for providing a synchronized data rerepresentation, comprising:
an original representation of data maintained by an originating application with presentation of the data through an originating user interface;
a rerepresentation of the data through a surrogate user interface by overlaying the data from the original application over a surrogate application using ancillary data from a supplemental application without modifying the original and surrogate applications, wherein the ancillary data comprises information related to the data from the originating application for placement of that data with respect to data from the surrogate application within the rerepresentation;
a collector to track actions applied to the originating user interface by a user;
an emitter to apply the tracked actions to the surrogate user interface and to collect surrogate actions performed by the user upon the surrogate user interface;
a base to reflect selections of the data across the originating user interface and the surrogate user interface and to synchronize actions on the data between the originating application and the surrogate application by receiving the tracked actions from the collector and the surrogate actions from the emitter, and marshalling the tracked actions to the emitter and the surrogate actions to the collector, wherein the collector applies the surrogate actions to the user interface of the originating application;
the collector to collect the tracked actions performed within the originating user interface based on a timing customized by the user;
the emitter to collect the surrogate actions performed within the surrogate user interface based on a further timing customized by the user;
the base to more frequently marshal one of the tracked actions within the representation and the surrogate actions within the rerepresentation based on one of the timing and the further timing customized by the user; and
a processor to execute the collector, emitter, and base.

16. A system according to claim 15, wherein the rerepresentation comprises one of a graphical rerepresentation and a textual rerepresentation.

17. A system according to claim 16, wherein the graphical rerepresentation comprises one or more of a map, graph, pie chart, timeline, bar graph, and spatial distribution chart.

18. A system according to claim 16, wherein the textual rerepresentation comprises one or more of an ordered list, text document, and redacted text.

19. A system according to claim 15, further comprising:
a structure module to structure the rerepresentation by arranging the data through one or more of location, temporal, and event characteristics.

20. A method for providing a synchronized data rerepresentation, comprising:
accessing data maintained by an originating application with presentation of the data through an originating user interface;
obtaining ancillary data from a supplemental application that communicates with the originating application and supplementing the data with the ancillary data, wherein the ancillary data comprises information related to the data from the originating application for placement of that data with respect to data from a surrogate application within the rerepresentation;
marshalling the data into a form useable by the surrogate application with rerepresentation of the data through a surrogate user interface by overlaying the data from the original application over the surrogate application using the ancillary data and without modifying the original and surrogate applications;
reflecting selections of the data across the originating user interface and the surrogate user interface; and
synchronizing actions on the data between the originating application and the surrogate application, comprising:
monitoring by an emitter the actions performed within the rerepresentation and applying the actions within the representation via a collector;
monitoring by the collector the actions performed within the representation and updates to the ancillary data, and applying the actions and updates within the rerepresentation via the emitter;
marshalling via a base the actions within the representation from the collector to the emitter and the actions within the rerepresentation from the emitter to the collector;
collecting the actions performed within the representation and the rerepresentation based on a timing customized by the user; and
more frequently marshalling the actions within the one of the representation and the rerepresentation based on the timing customized by the user.

21. A method according to claim 20, wherein the rerepresentation comprises one of a graphical rerepresentation and a textual rerepresentation.

22. A method according to claim 21, wherein the graphical rerepresentation comprises one or more of a map, graph, pie chart, timeline, bar graph, and spatial distribution chart.

23. A method according to claim 21, wherein the textual rerepresentation comprises one or more of an ordered list, text document, and redacted text.

24. A method according to claim 20, further comprising:
structuring the rerepresentation by arranging the data through one or more of location, temporal, and event characteristics.

* * * * *